United States Patent
Grohoski et al.

(10) Patent No.: US 7,370,243 B1
(45) Date of Patent: May 6, 2008

(54) PRECISE ERROR HANDLING IN A FINE GRAIN MULTITHREADED MULTICORE PROCESSOR

(75) Inventors: Gregory F. Grohoski, Austin, TX (US); Ricky C. Hetherington, Pleasanton, CA (US); Paul J. Jordan, Austin, TX (US); Robert M. Maier, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 651 days.

(21) Appl. No.: 10/881,111

(22) Filed: Jun. 30, 2004

(51) Int. Cl.
*G06F 11/00* (2006.01)

(52) U.S. Cl. ............................. 714/48; 714/5; 714/25; 714/42

(58) Field of Classification Search .................. 714/52, 714/49
See application file for complete search history.

(56) References Cited

U.S. PATENT DOCUMENTS

| | | | |
|---|---|---|---|
| 4,903,264 A | 2/1990 | Talgam et al. | |
| 4,982,402 A * | 1/1991 | Beaven et al. | 714/15 |
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,655,096 A * | 8/1997 | Branigin | 712/200 |
| 5,954,789 A | 9/1999 | Yu et al. | |
| 5,987,626 A * | 11/1999 | Greyzck | 714/38 |
| 6,047,112 A * | 4/2000 | Wise et al. | 714/1 |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,282,554 B1 | 8/2001 | Abdallah et al. | |
| 6,341,347 B1 | 1/2002 | Joy et al. | |

(Continued)

OTHER PUBLICATIONS

Tulsen et al., "Power-sensitive multithreaded architecture," IEEE 2000, pp. 199-206.

(Continued)

*Primary Examiner*—Scott Baderman
*Assistant Examiner*—Loan Truong
(74) *Attorney, Agent, or Firm*—Meyertons Hood Kivlin Kowert & Goetzel, P.C.; Rory D. Rankin

(57) ABSTRACT

A method and mechanism for error recovery in a processor. A multithreaded processor is configured to utilize software for hardware detected machine errors. Rather than correcting and clearing the detected errors, hardware is configured to report the errors precisely. Both program-related exceptions and hardware errors are detected and, without being corrected by the hardware, flow down the pipeline to a trap unit where they are prioritized and handled via software. The processor assigns each instruction a thread ID and error information as it follows the pipeline. The trap unit records the error by using the thread ID of the instruction and the pipelined error information in order to determine which ESR receives the information and what to store in the ESR. A trap handling routine is then initiated to facilitate error recovery.

19 Claims, 8 Drawing Sheets

U.S. PATENT DOCUMENTS

| | | |
|---|---|---|
| 6,349,319 B1 | 2/2002 | Shankar et al. |
| 6,357,016 B1 | 3/2002 | Rodgers et al. |
| 6,397,239 B2 | 5/2002 | Oberman et al. |
| 6,415,308 B1 | 7/2002 | Dhablania |
| 6,418,542 B1 * | 7/2002 | Yeager .................. 714/38 |
| 6,427,196 B1 | 7/2002 | Adiletta et al. |
| 6,434,699 B1 | 8/2002 | Jones et al. |
| 6,496,925 B1 | 12/2002 | Rodgers et al. |
| 6,507,862 B1 | 1/2003 | Joy et al. |
| 6,523,050 B1 | 2/2003 | Dhablania et al. |
| 6,549,930 B1 | 4/2003 | Chrysos et al. |
| 6,564,328 B1 | 5/2003 | Grochowski et al. |
| 6,567,839 B1 | 5/2003 | Borkenhagen et al. |
| 6,594,681 B1 | 7/2003 | Prabhu |
| 6,625,654 B1 | 9/2003 | Wolrich et al. |
| 6,629,236 B1 | 9/2003 | Aipperspach et al. |
| 6,629,237 B2 | 9/2003 | Wolrich et al. |
| 6,668,308 B2 | 12/2003 | Barroso et al. |
| 6,668,317 B1 | 12/2003 | Bernstein et al. |
| 6,671,827 B2 | 12/2003 | Guilford et al. |
| 6,681,345 B1 | 1/2004 | Storino et al. |
| 6,687,838 B2 | 2/2004 | Orenstien et al. |
| 6,694,347 B2 | 2/2004 | Joy et al. |
| 6,694,425 B1 | 2/2004 | Eickemeyer |
| 6,697,935 B1 | 2/2004 | Borkenhagen et al. |
| 6,728,845 B2 | 4/2004 | Adiletta et al. |
| 6,748,556 B1 | 6/2004 | Storino et al. |
| 6,754,856 B2 * | 6/2004 | Cofler et al. .................. 714/53 |
| 6,801,997 B2 | 10/2004 | Joy et al. |
| 6,820,107 B1 | 11/2004 | Kawai et al. |
| 6,847,985 B1 | 1/2005 | Gupta et al. |
| 6,857,064 B2 | 2/2005 | Smith et al. |
| 6,883,107 B2 | 4/2005 | Rodgers et al. |
| 6,889,319 B1 | 5/2005 | Rodgers et al. |
| 6,898,694 B2 | 5/2005 | Kottapalli et al. |
| 6,965,571 B2 * | 11/2005 | Webber .................. 370/242 |
| 7,117,389 B2 * | 10/2006 | Luick .................. 714/11 |
| 2002/0078334 A1 * | 6/2002 | Roth et al. .................. 712/244 |
| 2002/0087840 A1 * | 7/2002 | Kottapalli et al. .......... 712/219 |
| 2004/0215944 A1 * | 10/2004 | Burky et al. .................. 712/244 |
| 2004/0268103 A1 * | 12/2004 | Shelor .................. 712/244 |
| 2005/0015672 A1 * | 1/2005 | Yamada .................. 714/38 |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202, unknown date.

Smith, "The End of Architecture," May 29, 1990, pp. 10-17.

Alverson et al., "Tera Hardware-Software Cooperation," 16 pages, unknown date.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogeneous Parallelism on a Multithreaded Multiprocessor," ACM 1992, pp. 188-197.

Uhrig, et al., "Implementing Real-Time Scheduling Within A Multithreaded Java Microcontroller," 8 pages, unknown date.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, p. 16-21.

Gura, et al., "An End-to-End Systems Approach to Elliptic Curve Cryptography," 16 pages, unknown date.

Eberle, et al., "Cryptographic Processor for Arbitrary Elliptic Curves over $GF(2^m)$," 11 pages, unknown date.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |

Execution cycle

_Fig. 3_

| Trap Type 602 | Error Name 604 | Error Description 606 | Relative Priority 608 | ErrorType Field 610 |
|---|---|---|---|---|
| Instruction_Access_MMU_Error | ITTP | IT Tag Parity | 1 | 1 |
| | ITTM | IT Tag Multiple hit | 2 | 2 |
| | ITDP | IT Data Parity | 3 | 3 |
| | ITMC | IT MRA Correctable | 4 | 4 |
| | ITMU | IT MRA Uncorrectble | 4 | 5 |
| Fast_Instruction_Access_MMU_Miss | ITL2C | IT L2 Correctable | 5 | 1 |
| | ITL2U | IT L2 Uncorrectable | 5 | 2 |
| | ITL2ND | IT L2 NotData | 5 | 3 |
| Instruction_Access_Error | ICL2C | IC L2 Correctable | 6 | 1 |
| | ICL2U | IC L2 Uncorrectable | 6 | 2 |
| | ICL2ND | IC L2 NotData | 6 | 3 |

Fig. 6

| Trap Type 702 | Error Name 704 | Error Description 706 | Relative Priority 708 | ErrorType Field 710 |
|---|---|---|---|---|
| Internal Processor Error | IRFU | Integer Register File Uncorrectable | 7 | 1 |
| | IRFC | Integer Register File Correctable | 8 | 2 |
| | FRFU | Floating point Register File Uncorrectable | 7 | 3 |
| | FRFC | Floating point Register File Correctable | 8 | 4 |
| | SBDLC | Store Buffer Data Load hit Correctable | 9 | 5 |
| | SBDLU | Store Buffer Data Load hit Uncorrectable | 9 | 6 |
| | MRAC | MRA Correctable | 10 | 7 |
| | MRAU | MRA Uncorrectable | 10 | 8 |
| Data Access MMU Error | DTTP | DT Tag Parity | 11 | 1 |
| | DTTM | DT Tag Multiple hit | 12 | 2 |
| | DTDP | DT Data Parity | 13 | 3 |
| | DTMC | DT MRA Correctable | 14 | 4 |
| | DTMU | DT MRA Uncorrectable | 14 | 5 |

Fig. 7

PRECISE ERROR HANDLING IN A FINE GRAIN MULTITHREADED MULTICORE PROCESSOR

BACKGROUND OF THE INVENTION

1. Field of the Invention

The invention relates to computing systems and, more particularly, to error handling in a multithreaded processing system.

2. Description of the Related Art

With the ever expanding use of computing devices has come an increasing dependence of users on the availability and reliability of those devices. For example, if a computer network goes down, or is otherwise unavailable, costs to an enterprise may be significant. In addition, if corrupted data or other errors go undetected, significant costs may be incurred as a result of those errors. Consequently, a number of techniques have arisen which are designed to ensure that computing devices are sufficiently robust that they may detect and respond to problems without significantly impacting users. Computing devices which have in place mechanisms to prevent hardware or software problems from impacting its users may be referred to as being Highly Available. Some of the characteristics which may be considered when defining High Availability include protection of data (Reliability), continuous access to data (Availability), and techniques for correcting problems which minimally impact users (Serviceability). Collectively these characteristics are frequently referred to as RAS.

In addition to Reliability, Availability, and Serviceability, a high level of system performance is also generally desired. To that end, the performance of the processors within a given system may be very important. For example, the processors within servers and other network devices may have a significant impact on overall system performance. Consequently, efforts have been made to improve the performance of the processors themselves. In many cases, increasing the performance of a processor entails increasing the complexity of the processor as well. This complexity frequently results from the addition of logic designed to perform additional functions, or perform functions with higher performance levels.

In addition to adding new or improved logic and circuitry, another technique which may be used to increase performance involves shrinking feature sizes. However, as technology feature sizes shrink, circuits become more susceptible to hardware errors. And incorrect operation may result if those errors occur and go undetected. Frequently, these types of errors affect memory circuits, such as those found in caches, translation look-aside buffers (TLBs), register files, store buffers, and other memory arrays used for temporary storage. Consequently, using these and other techniques to increase processor performance may result in a reduction of the Reliability, Availability, and Serviceability of a system.

In order to deal with errors, processors and other devices may be configured to detect these errors using a variety of mechanisms. When an error is detected, the processor or device typically attempts to recover using a variety of recovery schemes. At one end of the spectrum, the hardware itself may be configured to correct the effects of the error. For example, the hardware may be configured to correct an erroneous data item fetched from a cache. In addition to correcting the effects of an error, hardware may be configured to clear an error by eliminating or correcting the source of the error. For example, if a cache line is detected to be in error, the cache line may be refetched. Subsequently, the instruction which caused the error may be retried. Alternatively, hardware may only be configured to report the fact that an error has occurred. Based upon this report, diagnostic software or a service processor may then be responsible for correcting and/or clearing the error.

In addition to the performance enhancing techniques described above, highly threaded processors may be developed and utilized in order to improve performance. However, the use of highly threaded processors may exacerbate the complexity of handling hardware errors. In modern pipelined multithreaded processors, instructions from different threads may be executing in different portions of the machine simultaneously. Consequently, errors can occur simultaneously in a wide variety of hardware structures. For example, errors from the instruction translation lookaside buffer (TLB), instruction cache, integer register file, floating-point register file, arithmetic circuits, data TLB, data cache, store buffer, and other components such as level 2 (L2) caches and main memory arrays can all occur simultaneously. In addition, these errors can occur both for instructions within and across threads. Moreover, in a multicore processor, errors can occur across multiple cores or in structures which are shared by multiple cores, such as shared L2 caches.

Consequently, error recovery in a multi-threaded, multi-core processor can quickly become very complex. Further, validating hardware error handling flows also becomes very complex. Complex error flows reduce the reliability of the design, since they increase the likelihood of a design flaw (bug) preventing proper error recovery when an error occurs. Still further, designing the correction and/or clearing of errors into the hardware generally reduces flexibility in how such errors are to be handled. Thus, as the number of threads increases, a design where hardware both corrects and clears errors may be infeasible given cost, time, power, and other constraints.

Accordingly, an effective method and mechanism for providing a high level of error detection and recovery capability while simplifying hardware error handling is desired.

SUMMARY OF THE INVENTION

A method and mechanism for error recovery in a processor are contemplated. A multithreaded processing core is configured to utilize software correction and clearing for as many errors as possible. Rather than correcting and clearing hardware detected machine errors, hardware is configured to report detected errors in a manner which facilitates recovery by software. Because software error recovery may generally depend upon hardware reporting the error as soon as possible, and with as clean a machine state as possible, hardware is configured to report errors precisely. Precisely reported errors ensure that all instructions prior to the one which caused or experienced an error have completed execution, and neither the instruction with the error nor any subsequent instructions have updated any state.

In order to meet these goals, a processor is contemplated which treats machine errors which can be attributed to instruction execution as precise errors. In one embodiment, the machine errors are handled almost identically to architectural traps such as typical program-related exceptions such as page faults, permission violations, or other software traps or programmer errors. In this manner the hardware error reporting mechanism may utilize logic similar to that normally used for reporting program exceptions. Both program-related exceptions and hardware errors are detected and, without being corrected by the hardware, flow down the pipeline to a trap unit where they are prioritized and handled via software.

In one embodiment, the processor is configured to assign each instruction a thread ID as it follows the pipeline. For each type of precise error, the error is logged in a precise error status register. There is one precise error status register (ESR) for instruction-related errors, and another for data-related errors. In one embodiment, both of these ESRs are the same registers used to report normal instruction-fetch or data-access exceptions. There is one set of ESRs per thread. If a precise hardware error occurs, the trap unit records the error by using the thread ID of the instruction and the pipelined error information in order to determine which ESR receives the information and what to store in the ESR.

These and other embodiments, variations, and modifications will become apparent upon consideration of the following description and associated drawings.

BRIEF DESCRIPTION OF THE DRAWINGS

FIG. 3 is a block diagram illustrating pipelined processing of several threads.

FIG. 6 is a table illustrating errors which are recorded in an Instruction Status Register.

FIG. 7 is a table illustrating errors which are recorded in a Data Status Register.

While the invention is susceptible to various modifications and alternative forms, specific embodiments are shown herein by way of example. It is to be understood that the drawings and description included herein are not intended to limit the invention to the particular forms disclosed. Rather, the intention is to cover all modifications, equivalents and alternatives falling within the spirit and scope of the present invention as defined by the appended claims.

DETAILED DESCRIPTION

Overview of Multithreaded Processor Architecture

Figure 1:
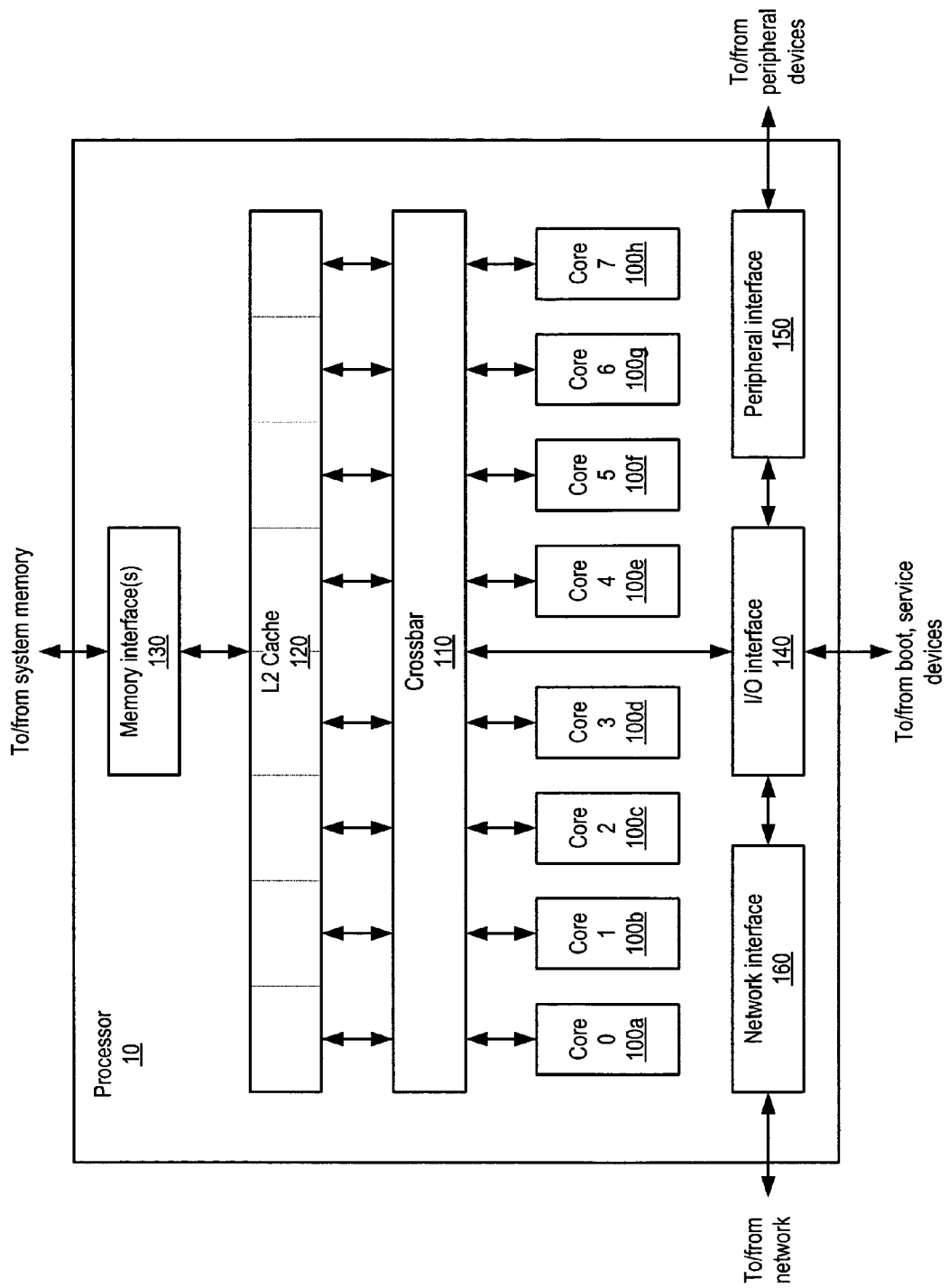
FIG. 1 is a block diagram illustrating one embodiment of a multi-threaded multi-core processor.

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150, and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC V9 ISA, although in other embodiments it is contemplated that any desired ISA may be employed, such as x86 compatible ISAs, PowerPC compatible ISAs, or MIPS compatible ISAs, for example. (SPARC is a registered trademark of Sun Microsystems, Inc.; PowerPC is a registered trademark of International Business Machines Corporation; MIPS is a registered trademark of MIPS Computer Systems, Inc.). In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any of the cores 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus DRAM (RDRAM), for example. (Rambus and RDRAM are registered trademarks of Rambus Inc.). In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express), although it is contemplated that any suitable interface standard or combination of standards may be employed. For example, in some embodiments peripheral interface 150 may be configured to implement a version of Universal Serial Bus (USB) protocol or IEEE 1394 protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
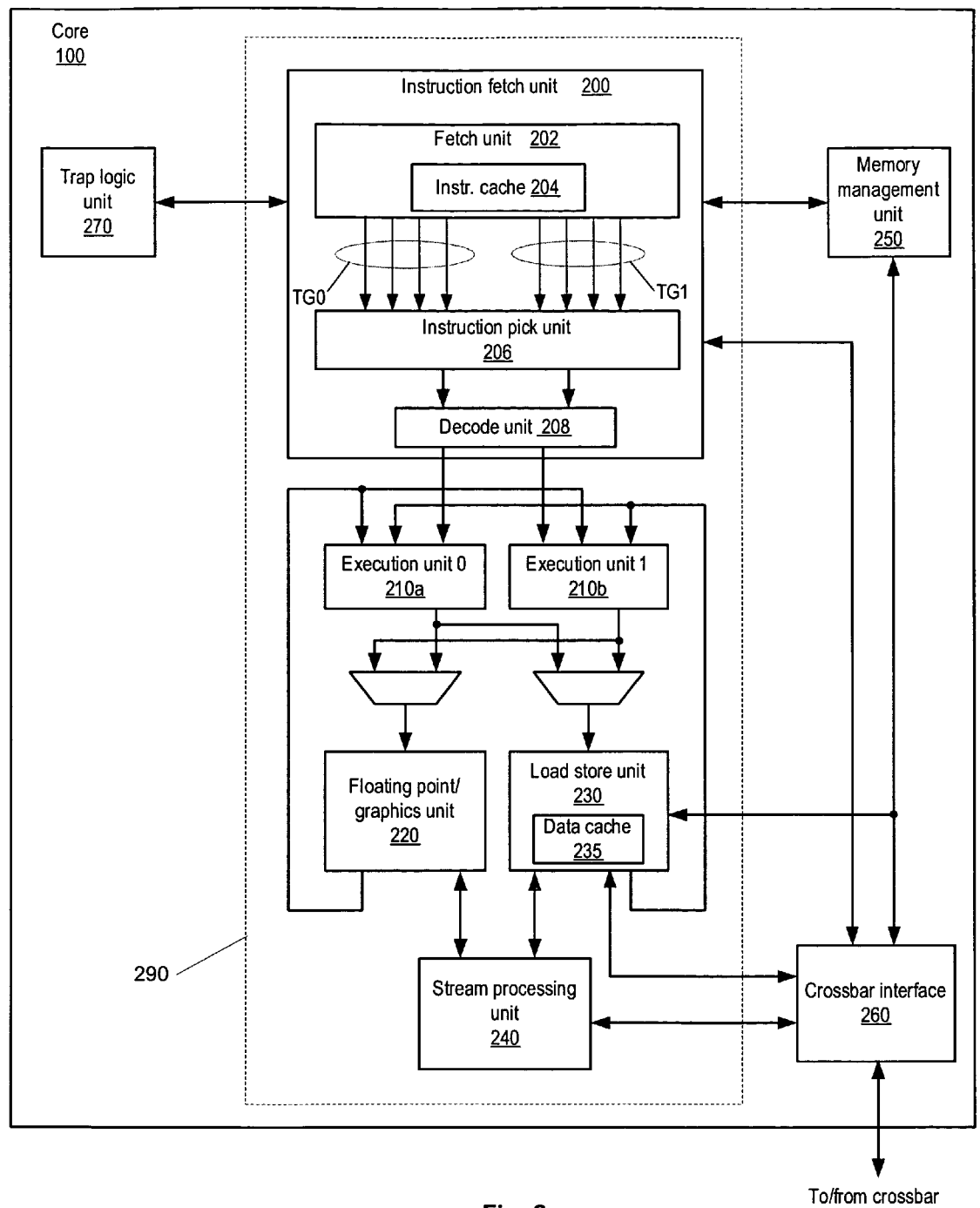
FIG. 2 is a block diagram illustrating one embodiment of a core depicted in FIG. 1.

FIG. 2 illustrates one embodiment of core 100 which is configured to perform fine-grained multithreading. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement an instruction buffer for each thread wherein several recently fetched instructions corresponding to a given thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1. For example, if core 100 implements eight threads, then each of thread groups TG0 and TG1 may include four threads. Alternative numbers of threads and groupings are possible and are contemplated.

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXUL 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 215 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands from FGU 220 or LSU 230, to freely schedule operations across its various algorithmic subunits and to signal FGU 220 or LSU 230 when a given result is ready to be written back or stored. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate processing of the result (for example, by using dedicated control registers to convey results).

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 208 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode or hypervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipeline stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipeline stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described above, in one embodiment each core 100 may be configured to handle detected machine errors in a manner similar to that of architectural traps. To that end, the hardware is configured to forego correcting and/or clearing detected errors in favor of software correction and/or clearing. When an error is detected, the hardware reports the error so that software may take corrective action. The information reported to software must be sufficient to allow the software to precisely identify the location of the error, so that it may both correct and clear the error, and either emulate the failing instruction, or return to and re-execute the failing instruction. Precisely reported errors ensure that all instructions prior to the one which caused or experienced an error have completed execution, and neither the instruction with the error nor any subsequent instructions have updated any state. As used herein, the term "precise error" may be used to refer to an error which is reported by hardware in a precise manner.

In one embodiment, precise errors include instruction TLB errors, data TLB errors, and integer and floating-point register file errors. These errors are detected as each instruction is being executed, and the error information flows down the pipeline with the instruction to the trap unit, where the trap unit records the error. For example, two threads, threads 0 and 7, may experience Instruction TLB tag parity errors. Both error reports flow down the execution pipeline, to the trap unit. The trap unit records the tag parity error for thread 0 in thread 0's error status register and the tag parity error for thread 7 in thread 7's error status register.

Figure 4:
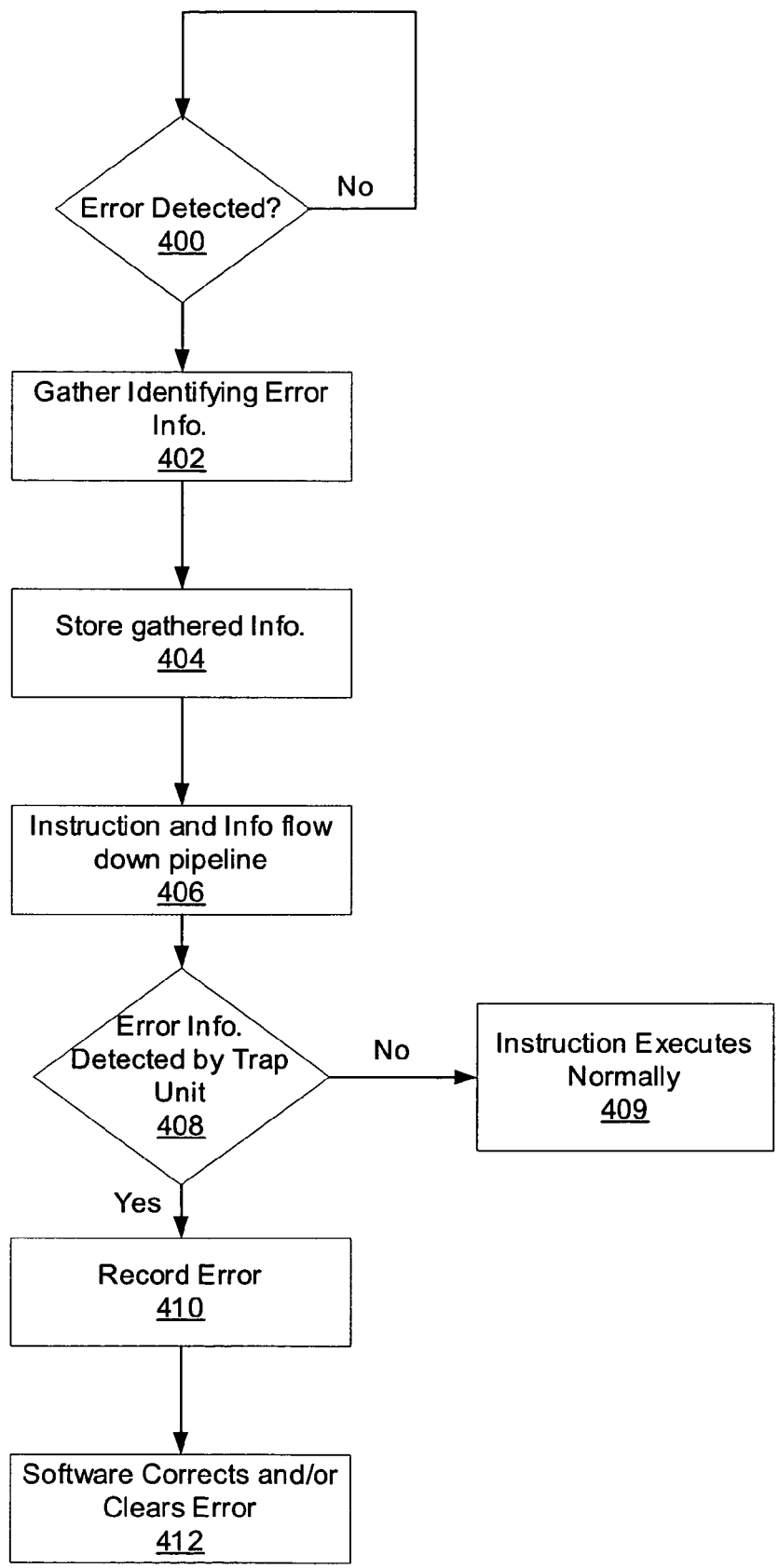
FIG. 4 provides an overview of an error handling flow.

FIG. 4 provides an overview of one embodiment of the cooperative hardware reporting and software error handling mechanism. In response to detecting an error (decision block 400), the hardware gathers information on the error which identifies the type of error (block 402) and any other information which may be used in correcting or clearing the error. The gathered information is then stored (block 404) and flows down the pipeline with the instruction (block 406) which is associated with the error. Information which flows down the pipeline with an instruction may also include an identification of the thread (e.g., a Thread ID) which corresponds to the instruction. It is noted that the hardware does not correct or clear the detected error. Rather, the hardware merely acts to identify the error for subsequent handling by software. The error causing instruction and related error information then continue down the pipeline.

Generally speaking, the trap handling circuitry may be configured to detect whether or not an error has been detected for each instruction. For example, in one embodiment the error information is detected by trap handling circuitry prior to the time of commit for each instruction. If no error has been detected for a particular instruction (decision block 408), then the instruction executes normally (block 409). Alternatively, if the trap handling circuitry determines that an error has been detected for an instruction, the trap handling circuitry may take action to recover from the error. Recovering from the error may include recording the error in an appropriate error status register (block 410) and vectoring to a trap handling routine in order to correct and/or clear the error. As the correction and/or clearing of the error is handled by the trap routine, modifications to the trap routine may be made as desired in order to alter how particular errors are handled. Consequently, much greater flexibility in how these errors are handled is possible.

It is noted that the instruction which is associated with the error has been unambiguously identified by the hardware. In addition, the trap handling circuitry detects the error and associated instruction prior to commit. Consequently, the trap handling circuitry may be configured to ensure that all instructions in the pipeline prior to the error associated instruction are executed. In addition, the trap handling circuitry may be configured to cause of flush of the instructions in the pipeline which follow the error associated instruction. As a Thread ID for the error associated instruction is also identified, and threads for each of the instructions in the pipeline may also be identified, a flush of only those instructions which correspond to the error associated instructions may be initiated. For example, if the error associated instruction corresponds to Thread 3, then a flush of Thread 3 instructions from the pipeline may be initiated.

Figure 5:
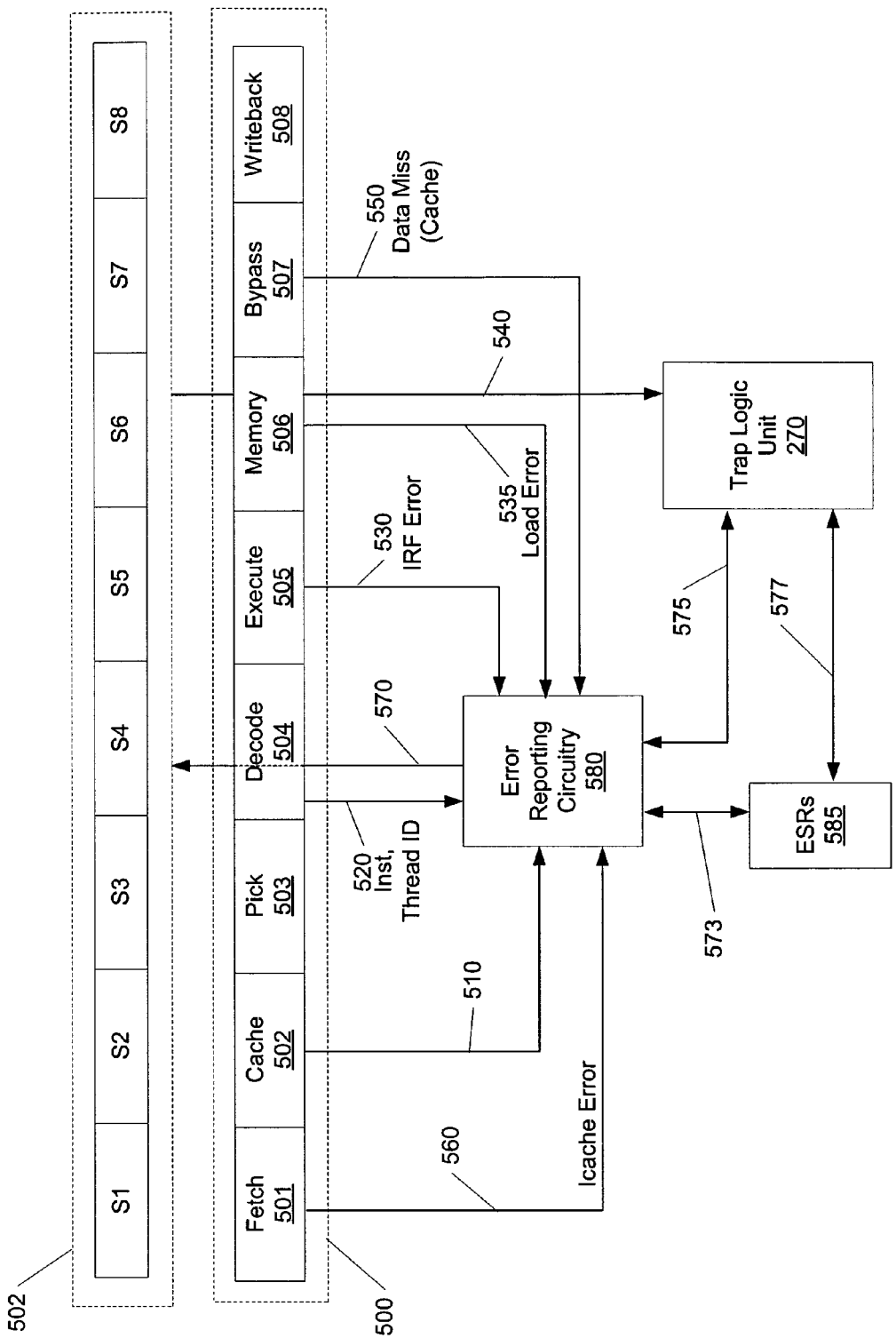
FIG. 5 is a block diagram illustrating one embodiment of a processing pipeline.

Turning now to FIG. 5, one embodiment of how the precise error handling mechanism may operate in relation to an execution pipeline within core 100 is shown. FIG. 5 depicts a pipeline 500 which generally corresponds to the pipeline described in relation to FIG. 3. Included in the pipeline 500 is a Fetch stage 501, Cache stage 502, Pick stage 503, Decode stage 504, Execute stage 505, Memory stage 506, Bypass stage 507, and Writeback stage 508. Also illustrated is a pipeline 502 of stored data with stages S1-S8 which correspond to each of the stages 501-508 in pipeline 500. Data stored within pipeline 502 may generally include identifying information for an instruction in the corresponding pipeline 500 stage. Such identifying information may include an identification of the instruction, a thread ID, any exception or trap information, and so on. Generally speaking, the associated information within pipeline 502 travels along the pipeline with the corresponding instruction. It is noted that while pipeline 502 is depicted as being separate from pipeline 500 (for ease of illustration), they may in fact be considered part of the same pipeline.

Also shown in FIG. 5 is error reporting circuitry 580 coupled to error status registers (ESR) 585 via bus 573 and TLU 270 via bus 575. In addition, circuitry 580 is shown to receive information from various stages of pipeline 500. For example, Fetch stage 501 is shown to convey error information 560 related to the Icache 204. In various embodiments this Icache error information may correspond to Instruction TLB and/or Icache data errors.

Cache stage 502 is coupled to provide an instruction (cache) miss indication 510 via bus 510. Decode state 504 is coupled to provide instruction and thread ID information 520 via bus 520. Execute stage 505 provides integer register file (IRF) error information via bus 530, and Bypass stage 507 provides a data (cache) miss indication 550 to TLU 270. Memory stage 506 may provide load error status to TLU 270 via bus 535. In addition, Memory stage 506 may provide trap related information to Trap Logic Unit 270 via bus 540.

Generally speaking, error reporting circuitry 580 may be configured to store information via bus 570 in pipeline 502 corresponding to errors detected during an instruction's traversal of pipeline 500. For example, if during Fetch stage 501 an Instruction TLB tag parity error is detected, and indication 560 of the error may be conveyed to (or otherwise detected by) circuitry 580. In response, error reporting circuitry 580 may store identifying information in the stage (S1) which corresponds to the error causing instruction. The information stored in stage S1 may identify the error, the instruction, the thread ID, and any other information desired. As the instruction flows down the pipeline, the related information which was originally stored in stage S1 flows with the instruction. Subsequently, the trap logic unit 270 detects the related information and logs the error. In one embodiment, the trap logic unit 270 logs the error in an error status register. In addition, the trap logic unit 270 may be configured to identify the error and vector to a corresponding trap. The trap code may then correct and/or clear the detected error as discussed in greater detail below.

Error Status Registers

In one embodiment, a core 100 uses four sets of error registers to record errors. Precise instruction-fetch related errors are logged in an Instruction Status register (ISR), and precise Data Access related errors are logged in a Data Status (DSR) and Data Address register (DAR). In addition, a disrupting error status register may be used to log errors which are not precise as described above. Disrupting errors may or may not be cleared and/or corrected by hardware. In one embodiment, there is one copy of the ESRs per thread. Finally, a fatal error register may be included to log fatal errors.

Hardware Errors Recorded in the Instruction Status Register (ISR)

A core uses the Instruction Status register to record precise hardware errors encountered during the instruction fetch process. Thus the ISR may record not only normal program errors (e.g., Instruction MMU errors such as page faults, protection exceptions, etc.) but also hardware errors such as Icache valid bit mismatches. Since a hardware error typically has a higher priority than a normal program error, the core may save hardware by reusing the ISR for precise instruction hardware errors. For most instruction fetch errors, a Trap Program Counter (TPC) within the trap logic unit 270 records the relevant virtual address.

FIG. 6 shows a table 600 illustrating hardware errors which may be recorded in the ISR. The table and errors shown in FIG. 6 are intended to be exemplary only. Other types of errors are both possible and contemplated. The Trap Type column 602 describes a trap type which will result if the error occurs and the trap is enabled. The ErrorName column 604 provides an abbreviated name for the hardware error and the Error Description column 606 provides a brief description of the error. The Relative Priority column 608 indicates a priority of the error as compared to the others. Finally, the error information recorded in the ISR is indicated by the encoding specified in the ErrorType field 610. Additional discussion regarding these and other errors will be provided below. MRA stands for the MMU Register Array which generally contains various configuration registers required for the MMU and hardware tablewalk.

Hardware Errors Recorded in the Data Status Register (DSR)

The processor records data-related precise hardware errors in the DSR. The error types recorded in the DSR are listed in table 700 of FIG. 7. Similar to table 600, table 700 includes a Trap Type column 702 which describes a trap type which will result if the error occurs and the trap is enabled, an ErrorName column 704 provides an abbreviated name for the hardware error, and an Error Description column 706 which provides a brief description of the error. The Relative Priority column 708 indicates a priority of the error as compared to the others. Finally, the error information recorded in the DSR is indicated by the encoding specified in the ErrorType field 710.

Core Error Trap Enable Register (CETER)

In addition to the ISR and DSR, each thread also has a Core Error Trap Enable Register (CETER) for use in masking particular types of errors. Table 1 below provides an illustration of one embodiment of a CETER.

TABLE 1

CETER format

| Reserved | PSCCE | DE | DHCCE | Reserved |
|----------|-------|-----|-------|----------|
| 63       | 62    | 61  | 60    | 59:0     |

Each of the CETER bits apply to a particular class of maskable errors. In general, non-maskable errors always result in traps regardless of the setting of the CETER bits. Bit 62 (Precise_Software_Corrected_and_Cleared_Enable) controls whether a trap will be taken if a maskable, precise software corrected and cleared error is detected during the execution of an instruction. Since hardware neither performs correction nor clearing of the error, software must take action to avoid unpredictable execution and possible data loss. This bit is generally always set for normal operation. Bit 61 (Disrupting_Enable) controls whether disrupting traps will be taken for a maskable disrupting error which is not hardware corrected and cleared. Bit 60 (Disrupting Hardware Corrected and Cleared Enable) controls whether a disrupting trap will be taken for a maskable disrupting hardware corrected and cleared error.

As described above, generally speaking the processor detects errors as they occur but pipelines precise error indications along with the instruction until commit time. At that time a precise error is recorded in either the Instruction Status register or Data Status register as appropriate. Table 2 below lists the Error Types which may be detected in one particular embodiment of the processor. Following Table 2 is a brief description of some of the errors noted in Table 2. In Table 2 below, 'C' means that the error can be corrected with software intervention. 'U' means that the error can not be corrected even with software intervention, but may still be recoverable. The Trap Type column specifies what type of trap is caused. 'P' stands for precise, while 'D' stands for disrupting. The core generally directs disrupting traps and precise traps to different vectors. Software can then inspect the ISR, DSR, or DESR to determine more information regarding the failure. As noted above, Precise errors are logged in either the ISR or the DSR, and Disrupting errors are logged in the DESR. As with the other tables described above, Table 2 is not intended to be comprehensive or limiting in any way. Rather, information provided by Table 2 is intended to be exemplary only. Numerous alternatives are possible and are contemplated.

TABLE 2

ERROR TYPES

| # | Error | Access Type or | Error Type | Trap Type | ESR Info |
|---|-------|----------------|------------|-----------|----------|
| 1 | ITLB Tag Parity (ITTP) | Fetch | C | P | |
| 2 | ITLB Tag Multiple hit (ITTM) | Fetch | C | P | |
| 3 | ITLB Data Parity (ITDP) | Fetch | C | P | |
| 4 | ITLB MRA Correctable (ITMC) | Fetch | C | P | MRA index[2:0] |
| 5 | ITLB MRA Uncorrectable (ITMU) | Fetch | U | P | MRA index[2:0] |
| 6 | ITLB L2 Correctable (ITL2C) | Fetch | C | P | Recorded in L2 ESR |
| 7 | ITLB L2 Uncorrectable (ITL2U) | Fetch | U | P | Recorded in L2 ESR |

TABLE 2-continued

ERROR TYPES

| # | Error | Access Type or | Error Type | Trap Type | ESR Info |
|---|---|---|---|---|---|
| 8 | ITLB L2 NotData (ITL2ND) | Fetch | U | P | Recorded in L2 ESR |
| 9 | Icache Valid bit (ICVP) | Fetch | C | D | Index[5:0], set[2:0] |
| 10 | Icache Tag Parity (ICTP) | Fetch | C | D | Index[5:0], set[2:0] |
| 11 | Icache Tag Multiple hit (ICTM) | Fetch | C | D | Index[5:0], set[2:0] |
| 12 | Icache Data Parity (ICDP) | Fetch | C | D | Index[5:0], set[2:0] |
| 13 | Icache L2 Correctable (ICL2C) | Fetch | C | P | Recorded in L2 ESR |
| 14 | Icache L2 Uncorrectable (ICL2U) | Fetch | U | P | Recorded in L2 ESR |
| 15 | Icache L2 NotData (ICL2ND) | Fetch | U | P | Recorded in L2 ESR |
| 16 | IRF correctable ECC error (IRFC) | EXU | C | P | Index[4:0], ECC bits |
| 17 | IRF uncorrectable ECC error (IRFU) | EXU | U | P | Index[4:0], ECC bits |
| 18 | FRF correctable ECC error (FRFC) | FGU | C | P | Index[5:0], ECC bits |
| 19 | FRF uncorrectable ECC error (FRFU) | FGU | U | P | Index[5:0], ECC bits |
| 20 | DTLB Tag Parity (DTTP) | Load | C | P | VA[47:0] in DAR |
| 21 | DTLB Tag Multiple hit (DTTM) | Load | C | P | VA[47:0] in DAR |
| 22 | DTLB Data Parity (DTDP) | Load | C | P | VA[47:0] in DAR |
| 23 | DTLB MRA Correctable (DTMC) | Load | C | P | MRA index[2:0] |
| 24 | DTLB MRA Uncorrectable (DTMU) | Load | U | P | MRA index[2:0] |
| 25 | DTLB L2 Correctable (DTL2C) | Load | C | P | Recorded in L2 ESR |
| 26 | DTLB L2 Uncorrectable (DTL2U) | Load | U | P | Recorded in L2 ESR |
| 27 | DTLB L2 NotData (DTL2ND) | Load | U | P | Recorded in L2 ESR |
| 28 | Dcache Valid bit (DCVP) | Load | C | D | Index[6:0], set[1:0] |
| 29 | Dcache Tag Parity (DCTP) | Load | C | D | Index[6:0], set[1:0] |
| 30 | Dcache Tag Multiple hit (DCTM) | Load | C | D | Index[6:0], set[1:0] |
| 31 | Dcache Data Parity (DCDP) | Load | C | D | Index[6:0], set[1:0] |

Instruction TLB (ITLB) Related Errors

Errors 1-8

In one embodiment, the ITLB is implemented as a content addressable memory (CAM) and a data array. The CAM stores the virtual or real address tag, while the data array stores the physical translation and page attributes. Each of the data array and the CAM are protected with a parity bit. On a hit to an ITLB entry, the parity of the matching CAM entry and the associated data entry is checked. ITLB error handling may depend upon the access type and whether or not hardware tablewalks (HWTW) are enabled.

1. ITLB CAM Parity Error (ITTP): In one embodiment, there are three access cases that can result in an ITLB CAM parity error. These 3 cases are:
   1. Accessing a non-locked entry with HWTW enabled
   2. Accessing a non-locked entry with HWTW disabled
   3. Accessing a locked entry In each of the above three cases, hardware does not invalidate the entry with the error. Rather, hardware logs the error by encoding ITTP in the ISR, and takes a precise Instruction_Access_MMU_Error trap (as noted in FIG. 6). The VA of the instruction fetch is recorded in a trap unit PC register (TPC). Software at the trap handler logs the error, and issues a demap_page for the VA indicated by the TPC. The trap handler then issues a retry instruction. Hardware refetches the instruction and reaccesses the ITLB. This time either a hit will occur (since the translation was reloaded by another thread), or a miss will occur. If an ITLB miss occurs, hardware retranslates the address and reloads the ITLB.

2. ITLB CAM Multiple Hit Error (ITTM): In one embodiment, the ITLB checks for multiple CAM hits on each access. A multiple CAM hit error may generally have lower priority than a CAM parity error.

When a multiple CAM hit occurs, hardware logs the error by encoding ITTM in the ISR, and takes a precise Instruction_Access_MMU_Error trap. The VA of the instruction fetch is recorded in TPC. Software at the trap handler logs the error, and issues a demap_all to the ITLB. Then it issues a retry instruction. Hardware refetches the instruction and reaccesses the ITLB. This time either a hit will occur (since the translation was reloaded by another thread), or a miss will occur. If an ITLB miss occurs, hardware retranslates the address and reloads the ITLB.

3. ITLB Data Parity Error: Similar to ITLB CAM parity errors, there are three types of access which can result in a data parity error. Generally speaking, hardware handles the cases the same as an ITLB CAM parity error, but logs an ITDP error in the ISR.

The access types are:
   1. Accessing a non-locked entry with HWTW enabled
   2. Accessing a non-locked entry with HWTW disabled
   3. Accessing a locked entry
   4-8. MRA or L2 error on an ITLB miss with HWTW enabled: Note that on a "normal" ITLB miss with HWTW enabled, an error can occur from the MRA or the L2 cache. For an MRA error, the ISR contains the proper encoding for an ITMC or ITMU error. The index of the failing MRA location is also recorded in the DSR. Hardware takes a precise, non-maskable Instruction_Access_MMU_Error trap. The VA of the instruction fetch is available in TPC. To recover from an MRA error, software can read the failing MRA location from the DSR. Software may attempt to perform a correction by reading the failing data and ECC check bits, computing the syndrome, writing corrected data to the MRA, then retrying the original instruction. Even if the MRA has an uncorrectable error, software may be able to recover if it has a "clean" copy of the MRA data elsewhere.

For an L2 error during HWTW, one of the ISR ITL2C, ITL2U, or ITL2ND encodings are set. The L2 records the physical address where the error occurred and the error type (C, U, NotData) in an error status register. The VA of the instruction fetch is available in TPC. Hardware takes a precise, non-maskable Fast_Instruction_Access_MMU_Miss trap. Software can attempt recovery from an L2 error by correcting the failing L2 data or invalidating the L2 line as appropriate. Then it can retry the instruction.

Instruction Cache Errors

Errors 9-15

In one embodiment, the L1 instruction cache contains tag, data, and valid bit arrays. Parity protects the data and tag arrays from single-bit errors. One parity bit protects each instruction word (4 Bytes), and one parity bit protects each tag entry. The valid bits are duplicated in the valid bit array. Instruction cache arrays are read during an instruction fetch. Icache array parity errors or valid bit mismatch errors result in a disrupting trap if the appropriate CETER bit 60 is set.

9. Icache Valid Bit Array Mismatch on Instruction Fetch: Hardware invalidates all ways in the cache index which had the mismatch and sends an "error nop" down the pipeline to the trap unit. Hardware logs the error by setting ICVP and writing the way and index of the error to the DESR. If CETER.DHCCE is set, hardware takes a disrupting trap so software can log the error. If CETER.DHCCE is not set, hardware refetches the instruction.

10. Icache Tag Parity Error on Instruction Fetch: Hardware handles a tag parity error on an instruction fetch the same way a valid bit mismatch is handled, except it encodes ICTP in the DESR. Hardware sends an "error nop" down the pipeline to the trap unit. If CETER.DHCCE is set, hardware takes a disrupting trap so software can log the error. If CETER.DHCCE is not set, hardware refetches the instruction.

11. Icache Tag Multiple Hit Error on Instruction Fetch: Hardware invalidates all ways if multiple tag hits occur on an instruction fetch and sends an "error nop" down the pipeline to the trap unit. Hardware sets ICTM and records the index and one of the ways which hit in the DESR. If CETER.DHCCE is set, hardware takes a disrupting trap so software can log the error. If CETER.DHCCE is not set, hardware refetches the instruction.

12. Icache Data Parity Error on Instruction Fetch: Hardware treats the case of a data parity error on instruction fetch similar to valid or tag parity errors. All ways in the index with the error are invalidated and hardware sends an "error nop" down the pipeline to the trap unit. Hardware sets ICDP and records the index and way with the error in the DESR. If CETER.DHCCE is set, hardware takes a disrupting trap so software can log the error. If CETER.DHCCE is not set, hardware refetches the instruction.

13-15. Normal Icache miss: On an Icache miss, hardware can get a correctable, uncorrectable, or NotData error from the L2. When the Icache detects an L2 error on the returning data, it looks at the CETER.PSCCE enable bit. If the bit is set, it creates an "icache miss L2 error nop" which flows down the pipeline to the trap unit. The error is recorded in the ISR by encoding one of ICL2C, ICL2U, or ICL2ND as appropriate. Since the enable is set, hardware takes a precise Instruction_Access_Error trap. The virtual address of the instruction fetch is logged in TPC. Software can attempt recovery from an L2 error by correcting the failing L2 data or invalidating the L2 line as appropriate. Then it can issue a retry to refetch the instruction. If CETER.PSCCE is not set, hardware does not create a nop. Instead, it uses the data from the L2. On a correctable error, the data from L2 is without error. On an uncorrectable or NotData error, however, the data is unpredictable so hardware will execute erroneous instructions. The ISR is not updated to log the error.

Register File Errors

Errors 16-19

16-19. RF Errors: The Integer Register File (IRF) is generally accessed via normal instructions. Each IRF entry is protected by SEC/DED ECC and up to 3 operands can be read from the IRF at a time. Hardware checks each operand's ECC independently. If hardware detects either a correctable or uncorrectable error for any valid operand, what happens depends upon the setting of CETER.PSCCE. If CETER.PSCCE is set, hardware records the error type in the DSR by encoding IRFC or IRFU as appropriate, and records the IRF index and ECC check bits in the DSR. It then generates a precise Internal_Processor_Error trap request to the core and hardware vectors to the trap handler. Software may correct an IRFC error before issuing a retry instruction. FRF errors are generally handled similarly. If CETER.PSCCE is not set, hardware may continue executing using erroneous data, possibly leading to unpredictable operation and data corruption.

Data TLB Errors

Errors 20-27

In one embodiment, the Data TLB (DTLB) is implemented as a CAM and a data array. The CAM stores the virtual or real address tag, while the 128 entry data array stores the physical address and page attributes. In addition, the data array and the CAM may each be protected with a parity bit. On a hit to a DTLB entry, the parity of the matching CAM entry and the associated data entry is checked. DTLB error handling depends upon the access type and whether or not hardware tablewalks are enabled.

20. DTLB CAM Parity Error: There are three access cases which can result in an DTLB CAM parity error. In each case, hardware does not invalidate the entry with the error. Hardware logs the error by encoding DTTP in the DSR, and takes a precise Data_Access_MMU_Error trap. The VA of the data access is recorded in the DAR. Software at the trap handler logs the error, and issues a demap_page to the VA of the data access. Then it issues a retry instruction. Hardware refetches the instruction and reaccesses the DTLB. This time either a hit will occur (since the translation was reloaded by another thread), or a miss will occur. If a DTLB miss occurs, hardware retranslates the address and reloads the DTLB. These three cases are:

1. Accessing a non-locked entry with HWTW enabled

2. Accessing a non-locked entry with HWTW disabled

3. Accessing a locked entry

21. DTLB CAM Multiple Hit Error: A multiple CAM hit error has lower priority than a CAM parity error. When a multiple CAM hit occurs, hardware logs the error by encoding DTMH in the DSR, and takes a precise Data_Access_MMU_Error trap. The VA of the data access is recorded in the DAR. Software at the trap handler logs the error, and issues a demap_all to the DTLB. Then it issues a retry instruction. Hardware refetches the instruction and reaccesses the DTLB. This time either a hit will occur (since the translation was reloaded by another thread), or a miss will occur. If a DTLB miss occurs, hardware retranslates the address and reloads the DTLB.

22. DTLB Data Parity Error: Hardware handles this case the same as a DTLB CAM parity error, but logs a DTDP error in the DSR. Hardware takes a precise Data_Access_MMU_Error trap. The VA of the data access is logged in the DAR. Software logs the error and demaps the page. It then issues a retry. Hardware refetches the instruction and reaccesses the DTLB. This time either a hit will occur (since the translation was reloaded by another thread), or a miss will occur. If a DTLB miss occurs, hardware retranslates the address and reloads the DTLB.

23-27. L2 and MRA Errors: Note that on a "normal" DTLB miss with HWTW enabled, an error can occur from the MRA or the L2 cache. In that case, error handling may be as follows. For an MRA error, the DSR contains the proper encoding for an DTMC or DTMU error. The index of the failing MRA location is also recorded in the DAR. Hardware takes a precise Data_Access_MMU_Error trap. To recover from an MRA error, software can read the failing MRA location from the DAR. Even if the MRA has an uncorrectable error, software may be able to recover if it has a "clean" copy of the MRA data elsewhere. For an L2 error, one of the DSR DTL2C, DTL2U, or DTL2ND encodings are set. L2 records the physical address where the error occurred and the error type (CE, UE, NotData) in an ESR. Hardware takes a precise, non-maskable Fast_Data_Access_MMU_Miss trap. The VA of the data access is available in the DAR. Software can attempt recovery from an L2 error by correcting the failing L2 data or invalidating the L2 line as appropriate. The instruction may then be retried.

Data Cache Errors

Errors 28-31

In one embodiment, the L1 data cache maintains a parity bit for every byte in the data arrays. One parity bit protects the tag portion of the data cache, and the valid array is duplicated. Parity is checked for all memory loads that access the data cache. On a data cache miss, hardware can get a correctable, uncorrectable, or NotData error from L2. L2 records the error in an L2 ESR. If CETER.PSCCE is set, hardware records the error in the DSR by encoding one of DCL2C, DCL2U, or DCL2ND as appropriate, then takes a precise Data_Access_Error trap. Software at the trap handler can attempt recovery from an L2 error by correcting the failing L2 data or invalidating the L2 line as appropriate. Then it can issue a retry to refetch the instruction. If CETER.PSCCE is not set, hardware uses the (possibly incorrect) data returned by L2. The error is not recorded. In the case of a DCL2C, the data will have been corrected by L2. Otherwise unpredictable operation and data corruption may result.

28. Dcache Valid Bit Error: If a load instruction detects a valid bit mismatch, hardware forces a cache miss, and invalidates all ways in the cache index which had the mismatch (via the L2). Hardware records the error by encoding DCVP and writing the index and way with the error in the DESR. Hardware completes the load by bypassing the data from L2. If CETER.DHCCE is set, hardware then takes a disrupting ECC_Error trap so software can log the error. If CETER.DHCCE is not set, hardware continues executing, and will take a disrupting ECC_Error trap when software sets the CETER.DHCCE bit.

29. Dcache Tag Parity Error on Load: A load instruction which detects a data cache tag parity error may be handled the same as if a valid bit mismatch was detected. Hardware invalidates all ways in the cache index with the tag parity error. DCTP is recorded in the DSR.

30. Dcache Tag Multiple Hit Error on Load: Hardware invalidates all ways if multiple tag hits occur on a load. Hardware records the error by encoding DCTM and writing the index and ways with the error in the DESR. Hardware completes the load by bypassing the data from L2. If CETER.DHCCE is set, hardware then takes a disrupting ECC_Error trap so software can log the error. If CETER.DHCCE is not set, hardware continues executing, and will take a disrupting ECC_Error trap when software sets the CETER.DHCCE bit.

31. Dcache Data Parity Error on Load: A load instruction which detects a data cache data parity error is handled the same as if a valid bit mismatch was detected. Hardware invalidates all ways in the data cache index which had the data parity error. Hardware records the error by encoding DCDP and writing the index and way with the error in the DESR. Hardware completes the load by bypassing the data from L2. If CETER.DHCCE is set, hardware then takes a disrupting ECC_Error trap so software can log the error. If CETER.DHCCE is not set, hardware continues executing, and will take a disrupting ECC_Error trap when software sets the CETER.DHCCE bit.

Exemplary System Embodiment

Figure 8:
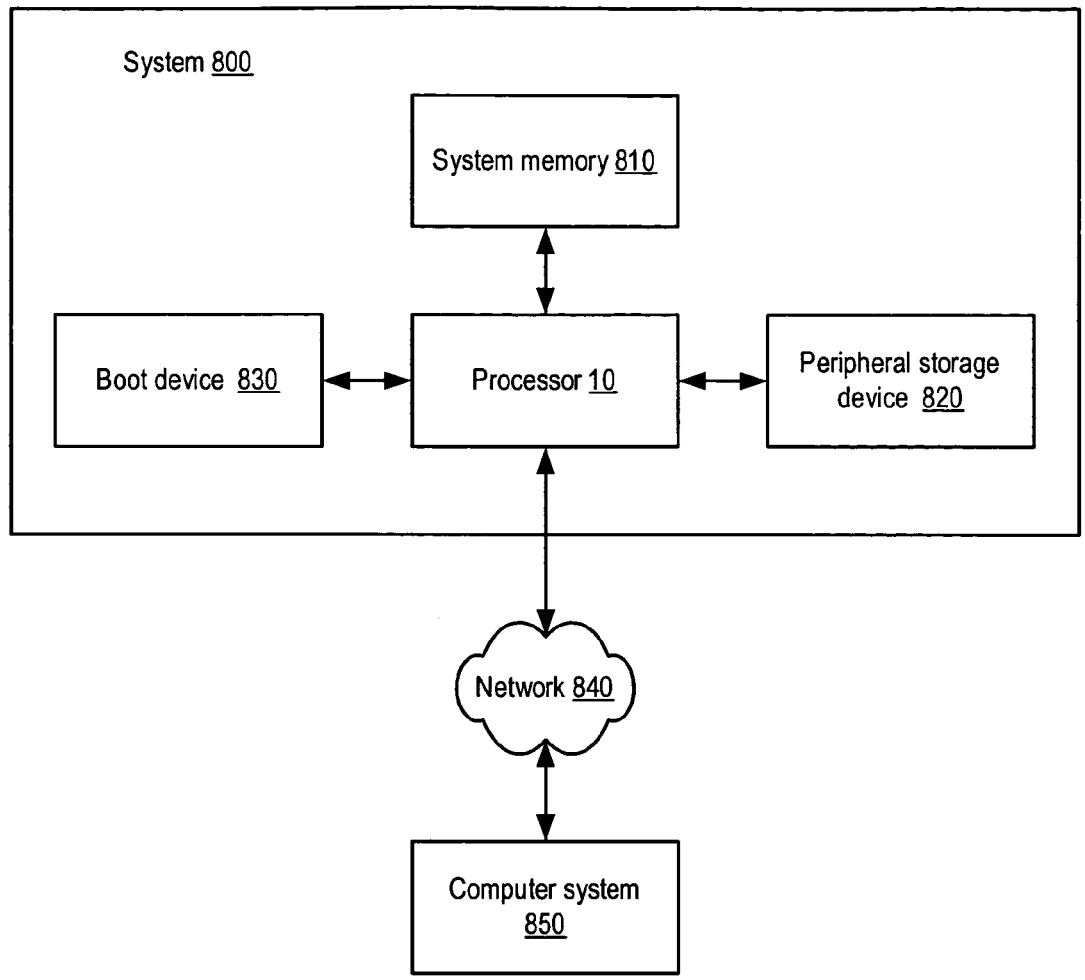
FIG. 8 is a block diagram illustrating one embodiment of a computing system.

As described above, in some embodiments processor 10 of FIG. 1 may be configured to interface with a number of external devices. One embodiment of a system including processor 10 is illustrated in FIG. 8. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DD2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

What is claimed is:

1. A multithreaded processing core comprising:
   a pipeline comprising a plurality of stages;
   error detection logic configured to:
      detect an error corresponding to the execution of an instruction at one of said plurality of stages;
      correct the error, in response to determining the error corresponds to a first category; and
      convey identifying information which corresponds to the error without correcting the error, in response to determining the error corresponds to a second category;
      wherein the first category corresponds to a correctable disrupting error, and the second category corresponds to a precise error;
   a trap logic unit configured to:
      detect the identifying information conveyed by the error detection logic;
      determine a first trap handling routine which corresponds to the detected error; and
      initiate said first trap handling routine.

2. The multithreaded processing core as recited in claim 1, wherein a precise error corresponds to a machine error which is attributable to instruction execution.

3. The multithreaded processing core as recited in claim 2, wherein the identifying information flows down the pipeline.

4. The multithreaded processing core as recited in claim 3, wherein the instruction flows down the stages of the pipeline concurrent with the flow of the identifying information as though the error had not been detected.

5. The multithreaded processing core as recited in claim 4, wherein the identifying information comprises a thread ID which identifies the thread to which the instruction corresponds.

6. The multithreaded processing core as recited in claim 5, wherein the trap handling routine corrects and/or clears the error.

7. The multithreaded processor as recited in claim 6, wherein the instruction corresponds to a thread with a first thread ID and the plurality of stages contain instructions corresponding to more than one thread, and wherein the trap logic unit is further configured to initiate a flush of only those instructions which follow the instruction and which correspond to the first thread ID.

8. A method for handling errors in a multithreaded processor, the method comprising:
   detecting an error which corresponds to the execution of an instruction at one of a plurality of pipeline stages;
   correcting the error, in response to determining the error corresponds to a first category;
   conveying identifying information which corresponds to the error without correcting the error, in response to determining the error corresponds to a second category;
   detecting the identifying information conveyed by the error detection logic;
   determining a first trap handling routine which corresponds to the detected error;
   initiating said first trap handling routine; and
   wherein the first category corresponds to a correctable disrupting error, and the second category corresponds to a precise error.

9. The method as recited in claim 8, wherein a precise error corresponds to a machine error which is attributable to instruction execution.

10. The method as recited in claim 9, wherein the identifying information flows down the pipeline.

11. The method as recited in claim 10, wherein the instruction flows down the stages of the pipeline concurrent with the flow of the identifying information as though the error had not been detected.

12. The method as recited in claim 11, wherein the identifying information comprises a thread ID which identifies the thread to which the instruction corresponds.

13. The method as recited in claim 12, wherein the trap handling routine corrects and/or clears the error.

14. The method as recited in claim 13, wherein the instruction corresponds to a thread with a first thread ID and the plurality of stages contain instructions corresponding to more than one thread, and wherein the trap logic unit is further configured to initiate a flush of only those instructions which follow the instruction and which correspond to the first thread ID.

15. A multithreaded multicore processor comprising:
   an interconnect; and
   a plurality of processing cores coupled to said interconnect;
   wherein a first core of said cores includes:
      a pipeline comprising a plurality of stages;
      error detection logic configured to:
         detect an error corresponding to the execution of an instruction at one of said plurality of stages;
         correct the error, in response to determining the error corresponds to a first category; and
         convey identifying information which corresponds to the error without correcting the error, in response to determining the error corresponds to a second category;
         wherein the first category corresponds to a correctable disrupting error, and the second category corresponds to a precise error;
      a trap logic unit configured to:
         detect the identifying information conveyed by the error detection logic;
         determine a first trap handling routine which corresponds to the detected error; and
         initiate said first trap handling routine.

16. The processor as recited in claim 15, wherein the identifying information flow down the stages of the pipeline.

17. The processor as recited in claim 16, wherein the trap handling routine corrects and/or clears the error.

18. The processor as recited in claim 17, wherein the instruction corresponds to a thread with a first thread ID and the plurality of stages contain instructions corresponding to more than one thread, and wherein the trap logic unit is further configured to initiate a flush of only those instructions which follow the instruction and which correspond to the first thread ID.

19. The processor as recited in claim 18, further comprising:

a peripheral storage device; and a system memory.

* * * * *